US009900280B2

(12) United States Patent
Geppert et al.

(10) Patent No.: US 9,900,280 B2
(45) Date of Patent: Feb. 20, 2018

(54) SYSTEM AND METHOD FOR MANAGING INCOMING REQUESTS FOR A COMMUNICATION SESSION USING A GRAPHICAL CONNECTION METAPHOR

(75) Inventors: Birgit Geppert, Basking Ridge, NJ (US); Frank Roessler, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 287 days.

(21) Appl. No.: 12/749,094

(22) Filed: Mar. 29, 2010

(65) Prior Publication Data
US 2010/0251119 A1 Sep. 30, 2010

Related U.S. Application Data

(60) Provisional application No. 61/164,753, filed on Mar. 30, 2009.

(51) Int. Cl.
*G06F 3/048* (2013.01)
*H04L 12/58* (2006.01)
(Continued)

(52) U.S. Cl.
CPC ............ *H04L 51/36* (2013.01); *G06F 3/0486* (2013.01); *G06F 3/04817* (2013.01);
(Continued)

(58) Field of Classification Search
CPC .. G06F 15/0266; G06Q 10/06; G06Q 10/109; H04M 3/42042
(Continued)

(56) References Cited

U.S. PATENT DOCUMENTS 5,140,562 A 8/1992 Moore-Ede et al.
5,195,086 A 3/1993 Baumgartner et al.
(Continued)

FOREIGN PATENT DOCUMENTS

CN 1292127 4/2001
DE 19543870 5/1996
(Continued)

OTHER PUBLICATIONS

Honda et al., "e-MulCS; Multi-Party Conference System with Virtual Space and the Intuitive Input Interface", Proceedings of the 2004 International Symposium on Applications and the Internet (SAINT'04) pp. 56-63, 2004.
(Continued)

*Primary Examiner* — Ryan Pitaro
(74) *Attorney, Agent, or Firm* — Sheridan Ross P.C.

(57) ABSTRACT

Disclosed herein are systems, methods, and non-transitory computer-readable storage media for presenting a selected media message to a first user. The method includes displaying via a graphical user interface (GUI) a notification associated with a request from a first user for a communication with a second user in the context of a graphical representation of a communication session including at least the second user, receiving a second user input identifying a selected action associated with the first user via the GUI, and performing the selected action relative to the first user. The second user can be notified of the incoming request via a communication session displayed as a set of graphical elements representing a structure of the communication session via the GUI. The first and/or second user can be a communication session of multiple users.

20 Claims, 11 Drawing Sheets

(51) Int. Cl.

| | | |
|---|---|---|
| *G06F 3/0481* | (2013.01) | |
| *G06F 3/0486* | (2013.01) | |
| *H04L 12/18* | (2006.01) | |
| *H04M 1/247* | (2006.01) | |
| *H04M 3/56* | (2006.01) | |
| *H04W 4/20* | (2018.01) | |
| *H04L 29/06* | (2006.01) | |
| *G06F 3/0484* | (2013.01) | |
| *G06Q 10/10* | (2012.01) | |
| *H04M 1/2745* | (2006.01) | |
| *H04M 3/42* | (2006.01) | |

(52) U.S. Cl.
CPC ...... *G06F 3/04842* (2013.01); *H04L 12/1822* (2013.01); *H04L 51/046* (2013.01); *H04L 65/1069* (2013.01); *H04L 65/403* (2013.01); *H04M 1/247* (2013.01); *H04M 1/27455* (2013.01); *H04M 3/563* (2013.01); *H04W 4/206* (2013.01); *G06Q 10/10* (2013.01); *H04M 1/274508* (2013.01); *H04M 3/42068* (2013.01); *H04M 3/42161* (2013.01); *H04M 3/42221* (2013.01); *H04M 3/42289* (2013.01); *H04M 3/564* (2013.01); *H04M 2201/42* (2013.01); *H04M 2203/5027* (2013.01); *H04M 2250/22* (2013.01); *H04M 2250/62* (2013.01)

(58) Field of Classification Search
USPC .................................................. 715/753, 758
See application file for complete search history.

(56) References Cited

U.S. PATENT DOCUMENTS

| | | | |
|---|---|---|---|
| 5,500,934 A | 3/1996 | Austin et al. | |
| 5,533,110 A * | 7/1996 | Pinard et al. | 379/355.01 |
| 5,627,978 A | 5/1997 | Altom et al. | |
| 5,745,711 A | 4/1998 | Kitahara et al. | |
| 5,758,079 A * | 5/1998 | Ludwig | G06Q 10/10 |
| | | | 348/E7.081 |
| 5,768,552 A | 6/1998 | Jacoby | |
| 5,892,764 A * | 4/1999 | Riemann et al. | 370/401 |
| 5,896,128 A | 4/1999 | Boyer | |
| 5,940,488 A * | 8/1999 | DeGrazia et al. | 379/93.23 |
| 5,949,414 A | 9/1999 | Namikata et al. | |
| 5,999,208 A | 12/1999 | McNerney | |
| 5,999,609 A | 12/1999 | Nishimura | |
| 6,011,553 A | 1/2000 | Komiyama | |
| 6,067,357 A | 5/2000 | Kishinsky et al. | |
| 6,191,807 B1 | 2/2001 | Hamada et al. | |
| 6,208,658 B1 | 3/2001 | Pickett | |
| 6,278,454 B1 | 8/2001 | Krishnan | |
| 6,286,034 B1 * | 9/2001 | Sato | G06F 9/54 |
| | | | 709/204 |
| 6,415,020 B1 | 7/2002 | Pinard et al. | |
| 6,445,682 B1 | 9/2002 | Weitz | |
| 6,496,201 B1 | 12/2002 | Baldwin et al. | |
| 6,501,740 B1 | 12/2002 | Sun et al. | |
| 6,559,863 B1 | 5/2003 | Megiddo | |
| 6,608,636 B1 | 8/2003 | Roseman | |
| 6,751,669 B1 | 6/2004 | Ahuja et al. | |
| 6,853,398 B2 | 2/2005 | Malzbender et al. | |
| D528,553 S | 9/2006 | Nevill-Manning et al. | |
| D529,036 S | 9/2006 | Koch et al. | |
| D529,037 S | 9/2006 | Koch et al. | |
| D529,920 S | 10/2006 | Nevill-Manning et al. | |
| 7,124,164 B1 | 10/2006 | Chemtob | |
| 7,127,685 B2 | 10/2006 | Canfield et al. | |
| 7,136,466 B1 * | 11/2006 | Gao | H04M 11/062 |
| | | | 370/352 |
| 7,162,699 B1 | 1/2007 | Pena-Mora et al. | |
| 7,167,182 B2 | 1/2007 | Butler | |
| 7,213,206 B2 | 5/2007 | Fogg | |
| 7,269,162 B1 | 9/2007 | Turner | |
| 7,478,129 B1 * | 1/2009 | Chemtob | 709/204 |
| D591,304 S | 4/2009 | Banks et al. | |
| 7,519,912 B2 | 4/2009 | Moody et al. | |
| 7,571,254 B1 * | 8/2009 | Canova, Jr. | G06Q 10/109 |
| | | | 709/248 |
| D603,866 S | 11/2009 | Banks et al. | |
| 7,644,144 B1 | 1/2010 | Horvitz et al. | |
| 7,653,013 B1 * | 1/2010 | Moran | H04L 12/1822 |
| | | | 370/260 |
| 7,734,692 B1 | 6/2010 | Kaplan et al. | |
| 7,780,533 B2 * | 8/2010 | Yamauchi | A63F 13/12 |
| | | | 463/29 |
| 7,831,917 B1 | 11/2010 | Karam | |
| 7,949,952 B2 * | 5/2011 | Hawley et al. | 715/751 |
| 8,062,302 B2 | 11/2011 | Lang et al. | |
| 8,082,302 B2 | 12/2011 | Becker et al. | |
| 8,144,633 B2 | 3/2012 | Yoakum et al. | |
| 8,223,186 B2 | 7/2012 | Derocher et al. | |
| 8,243,902 B2 | 8/2012 | Caspi et al. | |
| 8,375,034 B2 * | 2/2013 | Norton | G06Q 10/02 |
| | | | 707/748 |
| 8,607,250 B2 * | 12/2013 | Oral | G06Q 10/109 |
| | | | 705/7.13 |
| 8,775,595 B2 | 7/2014 | Leacock et al. | |
| 8,786,664 B2 | 7/2014 | Hornyak et al. | |
| 9,363,147 B2 | 6/2016 | Quillen et al. | |
| 2003/0001890 A1 | 1/2003 | Brin | |
| 2003/0002633 A1 | 1/2003 | Kredo et al. | |
| 2003/0055974 A1 | 3/2003 | Brophy | |
| 2003/0063072 A1 | 4/2003 | Brandenberg et al. | |
| 2003/0063728 A1 | 4/2003 | Sibal et al. | |
| 2003/0133562 A1 * | 7/2003 | Ooki | 379/242 |
| 2003/0206619 A1 | 11/2003 | Curbow et al. | |
| 2003/0236835 A1 | 12/2003 | Levi et al. | |
| 2004/0019683 A1 | 1/2004 | Lee et al. | |
| 2004/0028199 A1 | 2/2004 | Carlson | |
| 2004/0125937 A1 | 7/2004 | Turcan et al. | |
| 2004/0218751 A1 | 11/2004 | Colson et al. | |
| 2004/0235520 A1 | 11/2004 | Cadiz et al. | |
| 2004/0258222 A1 | 12/2004 | Kobrosly et al. | |
| 2004/0264652 A1 | 12/2004 | Erhart et al. | |
| 2005/0021624 A1 | 1/2005 | Herf et al. | |
| 2005/0132012 A1 | 6/2005 | Muller et al. | |
| 2005/0141694 A1 | 6/2005 | Wengrovitz | |
| 2005/0151836 A1 | 7/2005 | Ni | |
| 2005/0171412 A1 | 8/2005 | George | |
| 2005/0182745 A1 | 8/2005 | Dhillon et al. | |
| 2005/0187808 A1 * | 8/2005 | Adamson | G06Q 10/02 |
| | | | 705/5 |
| 2005/0251555 A1 | 11/2005 | Little, II | |
| 2006/0019655 A1 | 1/2006 | Peacock | |
| 2006/0023859 A1 | 2/2006 | Crockett et al. | |
| 2006/0031332 A1 | 2/2006 | Brownholtz et al. | |
| 2006/0053380 A1 | 3/2006 | Spataro et al. | |
| 2006/0059236 A1 | 3/2006 | Sheppard et al. | |
| 2006/0078883 A1 | 4/2006 | Ueda et al. | |
| 2006/0098793 A1 | 5/2006 | Erhart et al. | |
| 2006/0107303 A1 | 5/2006 | Erhart et al. | |
| 2006/0117264 A1 | 6/2006 | Beaton et al. | |
| 2006/0123082 A1 * | 6/2006 | Digate | G06Q 10/107 |
| | | | 709/205 |
| 2006/0135142 A1 | 6/2006 | Repka | |
| 2006/0147009 A1 | 7/2006 | Greenlee et al. | |
| 2006/0190546 A1 | 8/2006 | Daniell | |
| 2006/0235716 A1 | 10/2006 | Mahesh et al. | |
| 2006/0236269 A1 * | 10/2006 | Borna | 715/963 |
| 2007/0053308 A1 | 3/2007 | DuMas et al. | |
| 2007/0088818 A1 | 4/2007 | Roberts et al. | |
| 2007/0105548 A1 * | 5/2007 | Mohan | H04M 1/725 |
| | | | 455/426.1 |
| 2007/0121893 A1 | 5/2007 | Khouri et al. | |
| 2007/0174787 A1 | 7/2007 | Rhee | |
| 2007/0186193 A1 * | 8/2007 | Curran | G06Q 10/109 |
| | | | 715/780 |
| 2007/0201674 A1 | 8/2007 | Annadata et al. | |
| 2007/0206768 A1 | 9/2007 | Bourne et al. | |
| 2007/0208806 A1 | 9/2007 | Mordecai et al. | |

(56) References Cited

U.S. PATENT DOCUMENTS

| | | | |
|---|---|---|---|
| 2007/0219659 A1 | 9/2007 | Abhyanker et al. | |
| 2007/0260685 A1 | 11/2007 | Surazski | |
| 2007/0279484 A1 | 12/2007 | Derocher et al. | |
| 2007/0282621 A1 | 12/2007 | Altman et al. | |
| 2007/0288562 A1* | 12/2007 | Shaffer | G06Q 10/107 709/204 |
| 2007/0288627 A1 | 12/2007 | Abella et al. | |
| 2008/0005235 A1 | 1/2008 | Hegde et al. | |
| 2008/0030496 A1 | 2/2008 | Lee et al. | |
| 2008/0043963 A1 | 2/2008 | Kondapalli et al. | |
| 2008/0049921 A1* | 2/2008 | Davis | H04M 3/56 379/202.01 |
| 2008/0075247 A1 | 3/2008 | Tanaka et al. | |
| 2008/0080386 A1 | 4/2008 | Calahan et al. | |
| 2008/0088698 A1 | 4/2008 | Patel et al. | |
| 2008/0097816 A1 | 4/2008 | Freire et al. | |
| 2008/0115087 A1* | 5/2008 | Rollin et al. | 715/811 |
| 2008/0120371 A1 | 5/2008 | Gopal | |
| 2008/0148156 A1* | 6/2008 | Brewer et al. | 715/738 |
| 2008/0167056 A1* | 7/2008 | Gilzean et al. | 455/466 |
| 2008/0263475 A1 | 10/2008 | Hwang | |
| 2008/0266378 A1 | 10/2008 | Ryu | |
| 2008/0309617 A1 | 12/2008 | Kong et al. | |
| 2009/0006980 A1* | 1/2009 | Hawley et al. | 715/752 |
| 2009/0019367 A1 | 1/2009 | Cavagnari et al. | |
| 2009/0024952 A1 | 1/2009 | Brush et al. | |
| 2009/0054107 A1 | 2/2009 | Feland, III et al. | |
| 2009/0059818 A1* | 3/2009 | Pickett | 370/259 |
| 2009/0061832 A1* | 3/2009 | Goggans | H04M 19/04 455/414.1 |
| 2009/0086012 A1* | 4/2009 | Thapa | H04N 7/15 348/14.08 |
| 2009/0089683 A1* | 4/2009 | Thapa | 715/756 |
| 2009/0094559 A1 | 4/2009 | Shoshan | |
| 2009/0125819 A1 | 5/2009 | Hamilton, II et al. | |
| 2009/0138554 A1 | 5/2009 | Longobardi et al. | |
| 2009/0204904 A1* | 8/2009 | Mujkic | G06Q 10/109 715/753 |
| 2009/0228322 A1* | 9/2009 | van Os | G06Q 10/1093 705/7.18 |
| 2009/0241031 A1 | 9/2009 | Gamaley et al. | |
| 2009/0248709 A1 | 10/2009 | Fuhrmann et al. | |
| 2009/0248852 A1 | 10/2009 | Fuhrmann et al. | |
| 2009/0249226 A1 | 10/2009 | Manolescu et al. | |
| 2009/0290696 A1* | 11/2009 | K. N. | H04M 1/2473 379/142.04 |
| 2009/0307620 A1 | 12/2009 | Hamilton, II et al. | |
| 2009/0319623 A1 | 12/2009 | Srinivasan et al. | |
| 2010/0011304 A1 | 1/2010 | van Os | |
| 2010/0023585 A1 | 1/2010 | Nersu et al. | |
| 2010/0076807 A1* | 3/2010 | Bells et al. | 705/9 |
| 2010/0083137 A1 | 4/2010 | Shin et al. | |
| 2010/0083140 A1 | 4/2010 | Dawson et al. | |
| 2010/0085417 A1 | 4/2010 | Satyanarayanan et al. | |
| 2010/0093330 A1* | 4/2010 | Bluvband | H04M 1/274575 455/417 |
| 2010/0098230 A1* | 4/2010 | Bhow | H04L 12/1818 379/202.01 |
| 2010/0105437 A1* | 4/2010 | Lee | H04M 1/576 455/566 |
| 2010/0162153 A1* | 6/2010 | Lau | 715/769 |
| 2010/0167710 A1 | 7/2010 | Alhainen | |
| 2010/0180212 A1 | 7/2010 | Gingras et al. | |
| 2010/0182921 A1* | 7/2010 | Basart | H04M 7/0057 370/252 |
| 2010/0203875 A1* | 8/2010 | Nishimori | H04L 65/4061 455/416 |
| 2010/0222028 A1* | 9/2010 | Gisby | H04M 1/57 455/412.2 |
| 2010/0223089 A1* | 9/2010 | Godfrey | G06Q 10/1095 705/7.19 |
| 2010/0234052 A1 | 9/2010 | Lapstun et al. | |
| 2010/0246571 A1 | 9/2010 | Geppert et al. | |
| 2010/0246791 A1* | 9/2010 | Wang et al. | 379/201.02 |
| 2010/0251127 A1 | 9/2010 | Geppert et al. | |
| 2010/0251158 A1 | 9/2010 | Geppert et al. | |
| 2010/0251177 A1 | 9/2010 | Geppert et al. | |
| 2010/0273447 A1* | 10/2010 | Mann et al. | 455/405 |
| 2010/0312836 A1 | 12/2010 | Serr et al. | |
| 2011/0022968 A1 | 1/2011 | Conner et al. | |
| 2011/0109940 A1 | 5/2011 | Silverbrook et al. | |
| 2011/0151905 A1 | 6/2011 | Lapstun et al. | |
| 2011/0182415 A1* | 7/2011 | Jacobstein | H04L 12/1818 379/202.01 |
| 2011/0191136 A1* | 8/2011 | Bourne et al. | 705/7.18 |
| 2011/0222675 A1* | 9/2011 | Chua et al. | 379/93.01 |
| 2011/0271206 A1* | 11/2011 | Jones | G06F 3/0488 715/753 |
| 2011/0296312 A1 | 12/2011 | Boyer et al. | |
| 2011/0302509 A1* | 12/2011 | Leacock | G06Q 10/10 715/756 |
| 2012/0019610 A1 | 1/2012 | Hornyak et al. | |
| 2012/0077536 A1 | 3/2012 | Goel et al. | |
| 2012/0079099 A1 | 3/2012 | Dhara et al. | |
| 2012/0083252 A1 | 4/2012 | Lapstun et al. | |
| 2012/0084672 A1 | 4/2012 | Vonog et al. | |
| 2012/0110473 A1 | 5/2012 | Tseng | |
| 2012/0216129 A1 | 8/2012 | Ng et al. | |
| 2012/0259633 A1 | 10/2012 | Aihara et al. | |
| 2013/0080954 A1 | 3/2013 | Carlhian et al. | |
| 2013/0108035 A1 | 5/2013 | Lyman | |
| 2013/0250038 A1 | 9/2013 | Satyanarayanan et al. | |
| 2013/0268866 A1 | 10/2013 | Lyman | |
| 2014/0108023 A1* | 4/2014 | Arkoff | G06F 19/327 705/2 |
| 2014/0333713 A1* | 11/2014 | Shoemake | H04L 65/1069 348/14.05 |

FOREIGN PATENT DOCUMENTS

| | | |
|---|---|---|
| DE | 19716316 | 10/1998 |
| EP | 0453128 | 10/1991 |
| EP | 0717544 | 6/1996 |
| EP | 1480422 | 11/2004 |
| EP | 1983729 | 10/2008 |
| GB | 2338146 | 12/1999 |
| JP | H7-74834 | 3/1995 |
| JP | H08-251261 | 9/1996 |
| JP | 2004-199644 | 2/1997 |
| JP | 2002-297873 | 10/2002 |
| JP | 2003-296556 | 10/2003 |
| JP | 2004-102389 | 4/2004 |
| JP | H09-055983 | 7/2004 |
| JP | 2004-320235 | 11/2004 |
| JP | 2005-318055 | 11/2005 |
| JP | 2006-050370 | 2/2006 |
| JP | 2006-060340 | 3/2006 |
| JP | 2006-092367 | 4/2006 |
| JP | 2007-004000 | 1/2007 |
| JP | 2007-13694 | 1/2007 |
| JP | 2007-143144 | 6/2007 |
| JP | 2008-171068 | 7/2008 |
| JP | 2009-20829 | 1/2009 |
| JP | 2009-502048 | 1/2009 |
| JP | 2009-044679 | 2/2009 |
| KR | 2006-0058872 | 6/2006 |
| KR | 2006-0132484 | 12/2006 |
| KR | 2009-0001500 | 1/2009 |
| WO | WO 9821871 | 5/1998 |
| WO | WO 9945716 | 9/1999 |
| WO | WO 0018082 | 3/2000 |
| WO | WO 2006/054153 | 5/2006 |
| WO | WO 2006/060340 | 6/2006 |
| WO | WO 2007/008321 | 1/2007 |

OTHER PUBLICATIONS

Byrne et al., "Developing multiparty conferencing services for the NGN: towards a service creation framework", Jun. 2004, ISICT '04: Proceedings of the 2004 International Symposium on Information and Communication.

(56) References Cited

OTHER PUBLICATIONS

WebEx, WebEx Meeting Center User's Guide, 2007, WebEx Communications Inc., Version 8, pp. 1-332.
English Translation of Official Action for China Patent Application No. 201010195951.0, dated Nov. 30, 2015 10 pages.
Official Action with English Translation for China Patent Application No. 201310239355.1, dated Jan. 15, 2016 7 pages.
Official Action with English Translation for Korea Patent Application No. 2012-0062908, dated Dec. 30, 2015 7 pages.
Official Action for U.S. Appl. No. 12/749,028, dated Jun. 7, 2012 13 pages.
Official Action for U.S. Appl. No. 12/749,028, dated Nov. 21, 2012 11 pages.
Official Action for U.S. Appl. No. 12/749,028, dated May 2, 2014 14 pages.
Official Action for U.S. Appl. No. 12/749,028, dated Nov. 20, 2014 17 pages.
Official Action for U.S. Appl. No. 12/749,028, dated Aug. 4, 2015 18 pages.
Official Action for U.S. Appl. No. 12/749,028, dated Jan. 11, 2016 22 pages.
Official Action for U.S. Appl. No. 12/749,058, dated Oct. 2, 2012 13 pages.
Official Action for U.S. Appl. No. 12/749,058, dated Aug. 27, 2013 10 pages.
Official Action for U.S. Appl. No. 12/749,058, dated Feb. 3, 2014 11 pages.
Official Action for U.S. Appl. No. 12/749,058, dated Aug. 29, 2014 39 pages.
Official Action for U.S. Appl. No. 12/749,058, dated Sep. 17, 2015 43 pages.
Official Action for U.S. Appl. No. 12/749,123, dated Feb. 29, 2012 11 pages.
Official Action for U.S. Appl. No. 12/749,123, dated Jul. 23, 2012 9 pages.
Official Action for U.S. Appl. No. 12/749,123, dated May 2, 2014 13 pages.
Official Action for U.S. Appl. No. 12/749,123, dated Sep. 10, 2015 9 pages.
Official Action for U.S. Appl. No. 12/749,123, dated Dec. 21, 2015 10 pages.
Official Action for U.S. Appl. No. 12/749,150, dated Jun. 13, 2012 11 pages.
Official Action for U.S. Appl. No. 12/749,150, dated Oct. 24, 2012 10 pages.
Official Action for U.S. Appl. No. 12/749,150, dated Aug. 13, 2014 11 pages.
Official Action for U.S. Appl. No. 12/749,150, dated Nov. 21, 2014 10 pages.
Official Action for U.S. Appl. No. 12/749,150, dated Dec. 15, 2015 10 pages.
Decision to Refuse for European Patent Application No. 10158401.9, dated Jun. 2, 2017 10 pages.
Decision to Refuse for European Patent Application No. 10158453.0, dated Jun. 16, 2017 13 pages.
Summons to Attend Oral Proceedings for European Patent Application No. 10158453.0, dated Jun. 23, 2016 6 pages.
Intention to Grant for European Patent Application No. 10158406.8, dated May 24, 2017 53 pages.
Intention to Grant for European Patent Application No. 10158403.5, dated May 29, 2017 60 pages.
Summons to Attend Oral Proceedings for European Patent Application No. 10158399.5, dated Jun. 9, 2016 5 pages.
Official Action for U.S. Appl. No. 12/749,028, dated Jul. 6, 2016 24 pages.
Official Action for U.S. Appl. No. 12/749,028, dated Dec. 16, 2016 28 pages.
Official Action for U.S. Appl. No. 12/749,028, dated Apr. 6, 2017 24 pages.
Official Action for U.S. Appl. No. 12/749,028, dated Nov. 2, 2017 21 pages.
Official Action for U.S. Appl. No. 12/749,058, dated Apr. 7, 2016 33 pages.
Official Action for U.S. Appl. No. 12/749,058, dated Feb. 9, 2017 36 pages.
Official Action for U.S. Appl. No. 12/749,058, dated Aug. 18, 2017 38 pages.
Official Action for U.S. Appl. No. 12/749,123, dated Oct. 3, 2016 17 pages.
Official Action for U.S. Appl. No. 12/749,123, dated Dec. 6, 2016 17 pages.
Official Action for U.S. Appl. No. 12/749,123, dated May 10, 2017 16 pages.
Official Action for U.S. Appl. No. 12/749,123, dated Sep. 12, 2017 26 pages.
Official Action for U.S. Appl. No. 12/749,150, dated May 17, 2016 17 pages.

* cited by examiner

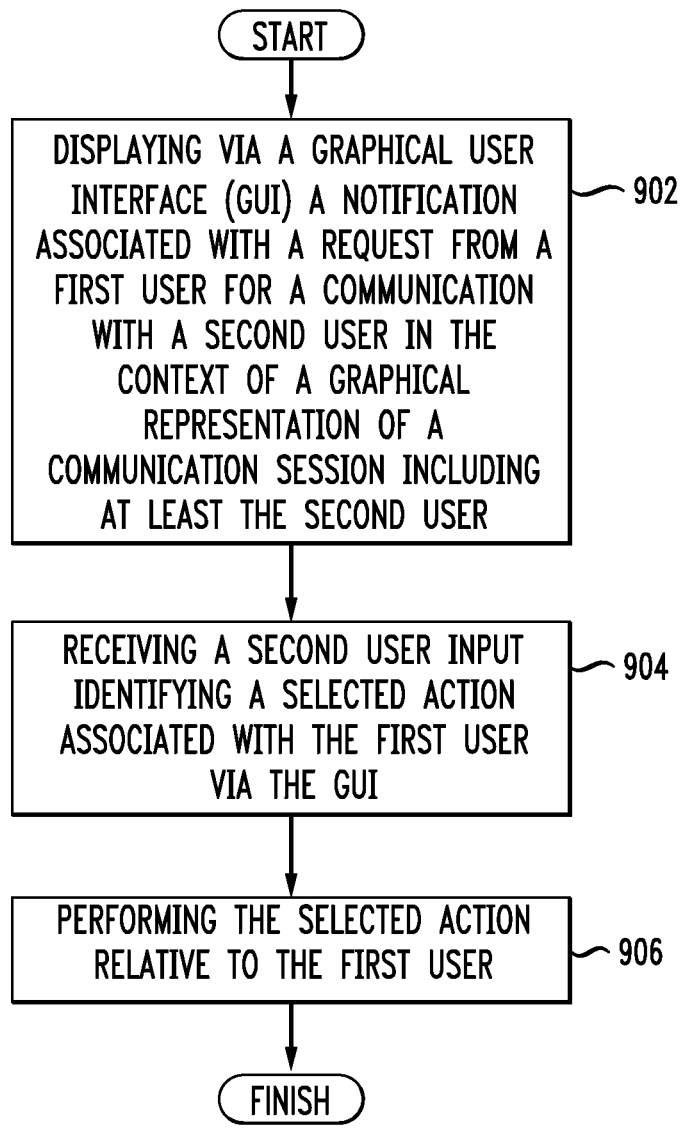

SYSTEM AND METHOD FOR MANAGING INCOMING REQUESTS FOR A COMMUNICATION SESSION USING A GRAPHICAL CONNECTION METAPHOR

RELATED APPLICATIONS

This application claims priority to U.S. Provisional Application No. 61/164,753, filed 30 Mar. 2009, which is incorporated herein by reference in its entirety.

This application is related U.S. patent application Ser. Nos. 12/749,028, 12/749,058, 12/749,123, 12/749,150, 12/749,103, 12/749,178, and 12/749,122 filed on Mar. 29, 2010, each of which is herein incorporated by reference.

BACKGROUND

1. Technical Field

The present disclosure relates to telecommunications and more specifically to managing communication sessions via a graphical user interface (GUI) in the context of presenting a particular message or service to a specific calling or called party or to a party requesting a connection to a communication session. Communication sessions can be multi-media sessions.

2. Introduction

Touchtone telephones have been supplemented over the years by the addition of feature buttons and menus. Interfaces for these features have evolved from simple buttons to hierarchical menus actuated by trackballs, quadrant style pointers, and the like. As the number of features increases, the interfaces add more buttons, sequences, and/or combination of button presses. This proliferation of features has led to a multitude of different interfaces with varying levels of complexity. Often users resort to rote memorization of key features, but that is not always practical or desirable. Recently, smartphones with touch-sensitive displays have begun to provide similar functionality. However, the touch-sensitive displays in such devices typically reproduce the feature buttons and menus, albeit on a touch-sensitive display.

Further, users are migrating to other communication forms, such as text messaging, instant messaging, email, chat sessions, video conferencing, and so forth. Incorporating the ability to handle these modes of communication into a traditional telephone increases the complexity and difficulty manyfold. What is needed in the art is a more intuitive communication management interface.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 9 illustrates an example method embodiment for displaying a notification associated with a request from a first user for a communication with a second user.

DETAILED DESCRIPTION

Figure 1:
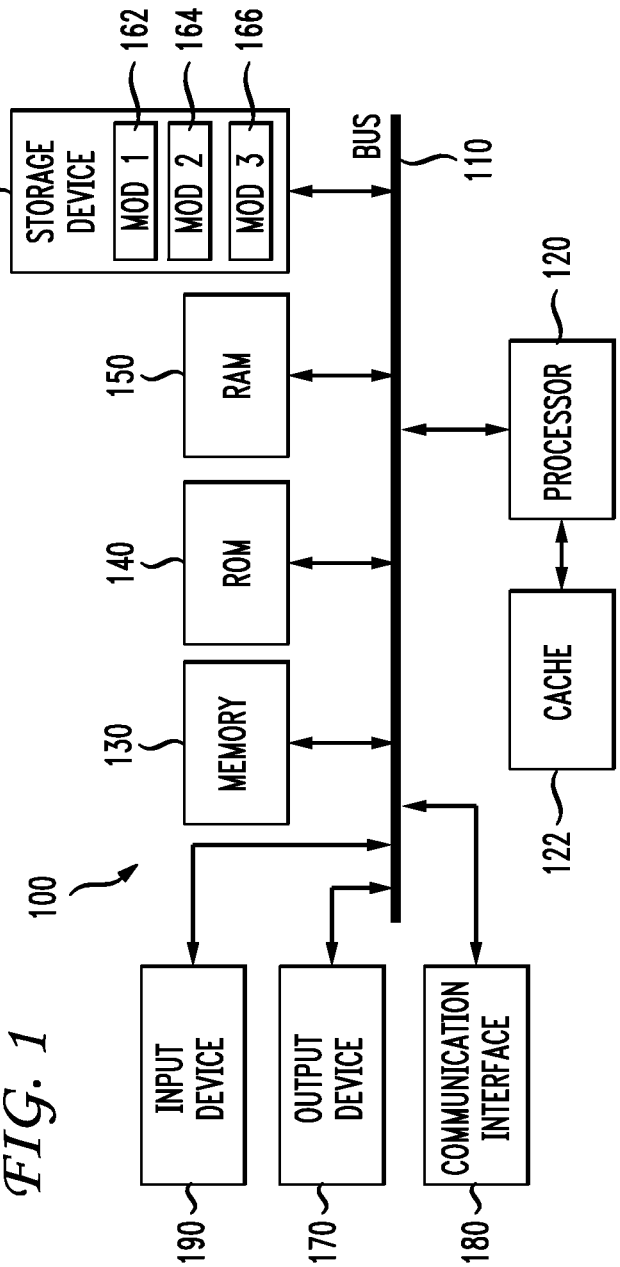
FIG. 1 illustrates an example system embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved communication session management. A companion case (U.S. Patent Publication No. US2010/0251158, published Sep. 30, 2010) discloses a graphical interface which enables a user to setup a communication session with various users and tear down or remove users from a communication session. A system and method are disclosed which displays on a graphical user interface a set of graphical connected elements representing a structure of a particular communication session or group of communication sessions for a user. A brief introductory description with reference to FIGS. 2A-2D will be provided, followed by a discussion of a basic general purpose system in FIG. 1 which can be employed to practice the concepts disclosed herein and more detailed descriptions of methods and graphical interfaces.

Presenting the graphical interface of FIGS. 2A-2D, which illustrates the communication session, enables the system to receive via the interface user input, which can include multimodal user input, to manage the communication session. For example, a user on a conference call can drag and drop or otherwise move and locate from a contacts list another person to add to the communication session. The system receives that input and automatically dials the phone number for that contact and adds them to the conference call. Users can be dropped from the call by dragging a connected element representing the user to a trash bin or other icon representing deleting them from the communication session.

The communication session is also agnostic with respect to the mode of communication. The same metaphor of a connected user in a communication session being displayed on the graphical interface can represent a called/calling user, an instant messaging (IM) user, an email user, a user connecting via video conferencing, web conferencing, and so forth. For example, from the context shown in FIG. 2A, the user can select a contact and then use the same type of user input (drag and drop, flicking, gestures, etc.) to initiate any of the communication modes with that person. The user does not have to know or learn different input mechanisms for different communication modes.

The presentation of the graphical elements in connection with participants in a session, how they are connected and how the user interacts with the elements all vary depending on the needs and current active context of the communication session. For example, elements associated with participants in a session can include text, titles, positions, or any other data about each user. The connection metaphor between users can also represent information such as the type of connection (phone, video, web conference, etc), the quality of the connection (low-band, high-band, etc.), a hierarchy of how participants are related to the primary user (friend, associate, acquaintance, un-trusted user, etc.), a status of the connection (active, inactive, on-hold, etc.), and so forth. These variations shall be discussed throughout this disclosure.

The present disclosure focuses on a concept available in the context of the graphical communication sessions introduced above. The concept relates to how to apply services applications, such as presenting music on hold, presenting specific recorded messages, recording the call or storing an IM or email, forwarding a call, presenting custom greetings, etc. for specific callers or called parties or parties associated with the communication session in other modes. For example, assume three people are participating in a telephone conference. If Mary calls John while he is in the telephone conference and John can manage the telephone conference via a graphical communications system, then the system can visually indicate the incoming call from Mary. This disclosure presents various options and variations on how John can handle that incoming communication efficiently and easily. Accordingly, this disclosure will describe a variety of embodiments that relate to different mechanisms for communicating various messages and a variety of ways to individuals associated with a communications session. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. If the device includes a graphical display which also receives touch sensitive input, the input device 190 and the output device 170 can be essentially the same element or display. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having briefly discussed the exemplary system embodiment, the disclosure now turns to FIGS. 2A, 2B, 2C, and 2D and other graphical views of an interface for managing communication sessions. A system 100, such as the one described in FIG. 1, can be configured to display a graphical user interface 200, such as the one described in FIGS. 2A-2D, and receive input for manipulating and managing the communication session. In one aspect, the system 100 interacts with a communications device, such as a telephone, instant messenger, personal or mobile computer, or email device to manage the communication session. For example, a user may have a desktop telephone that is in communication with a computing device which can interface with the telephone and present a display such as that shown in FIGS. 2A-2D to manage communication sessions using the telephone.

Figure 2A:
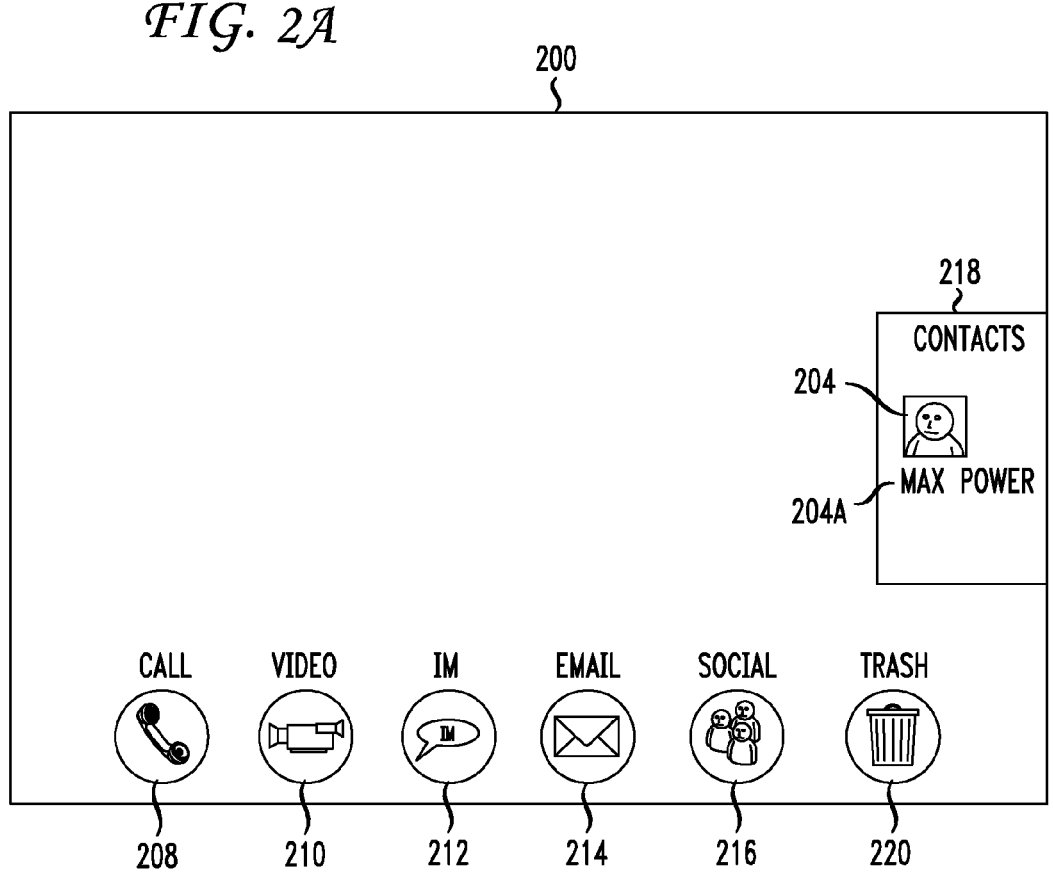
FIG. 2A illustrates an initial view not having any communication sessions.

FIG. 2A illustrates a display 200 of an initial graphical view without any communication sessions. The display 200 can include a series of icons 208, 210, 212, 214, 216, 220, and a contacts list 218 for initiating a communication session or interacting with an incoming communication session, for example. The series of FIGS. 2A-2D shall illustrate communication session management features such as setup and teardown of communication sessions, adding and removing participants from sessions, and so forth from the initial state shown in FIG. 2A.

As shall be discussed, from the context of FIG. 2A, the user can identify a person to contact, and then initiate any type of communication using the same mode to initiate any other type of communication. The system is agnostic in this respect. A drag and drop, gesture, tapping or any input mode described herein can be used to initiate and establish a phone call, teleconference with a group of individuals, an IM or email session, and so forth. Various examples of different inputs will be described in connection with the utility icons 208, 210, 212, 214, 216, 220 but any input mode can be applied to engage any utility.

Figure 2B:
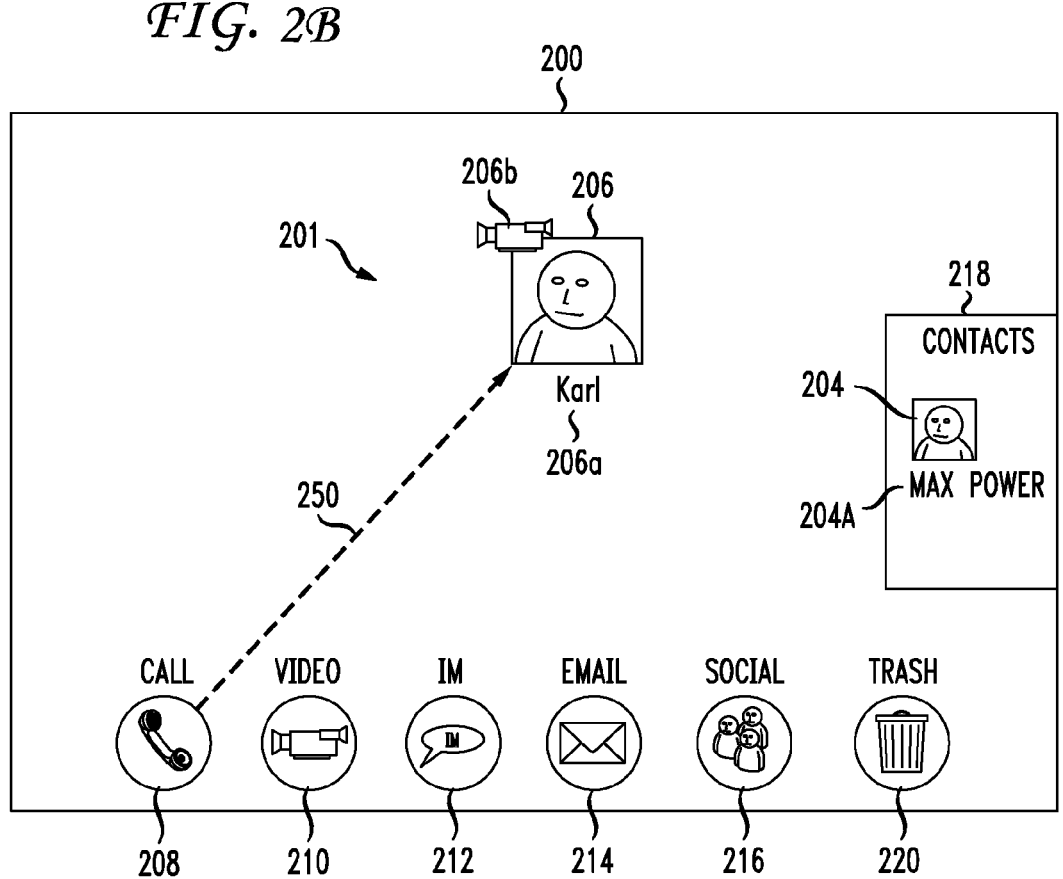
FIG. 2B illustrates a view of an incoming communication session.

FIG. 2B illustrates a view of an incoming communication session 201. The incoming communication session 201 can be any type of session such as an incoming phone call, incoming instant message, incoming text message, incoming request for a web conference or, in this case, an incoming video conference. The incoming communication session 201 shows an icon 206 representing the requester, Karl. The icon 206 can include sub-parts such as a name/title 206a and a communication modality icon 206b, among others. The user can interact with the incoming communication session 201, for example, by clicking and dragging a modality icon onto the incoming communication session 201 to accept the incoming video conference request from Karl 206. In this example, the user clicks and drags 250 the icon for the telephone modality 208. The user can select a different icon. The user can also provide other types of input to interact with communication sessions, such as tapping an icon via a touch screen or stylus, a flicking gesture, mouse clicks/movements, speech input, keyboard input, swipes or taps on a touch-sensitive surface, touchless gestures, and/or any other combination of suitable user input. In the case of touch, for example, taps of different duration or pressure can perform different actions. User input can include mouse movement, clicks, right clicks, double clicks, dragging, flicking, hovering, gestures, and so forth. The device can be shaken or tilted to receive accelerometer input, or positional/orientation input that indicates certain actions. Actions generally relate to connecting a utility icon with one ore more entities to perform functions such as ignore, send a message, accept an incoming call, create a communication session, remove a person from a session, and so forth.

Although FIG. 2B illustrates an incoming communication session 201, the user can initiate communication sessions in a number of other ways. For example, the user can drag a contact from a list of contacts 218 onto one of the communication modality icons 208, 210, 212, 214, 216. The user can also scroll through the list of contacts 218 to locate and select a contact 204 having an identifier 204a or group of desired contacts, then double-click or tap on the selected group to initiate a communication session. The identifier 204a can also include a graphic or icon showing available modes of communication for that contact (IM only), presence information (in their office but on a call) or scheduling information (such as the person is/is not available but has an opening in 1 hour). Information in a graphical form can also include local time, a time in the time zone of the host of the communication session, and/or biological time. Biological time can be an aspect of context. For example, a person who is acclimated to the Pacific time zone but who is currently located in the Eastern time zone may accept telephone call communication sessions at 10:00 p.m. local time even though others in the Eastern time zone may not. This information can help the user know whether to seek a communication with that contact. Such information can also be presented in connection with any icon or graphic representing an entity in a communication session. Other user interface variations can be used in addition to or in place of these examples.

Figure 2C:
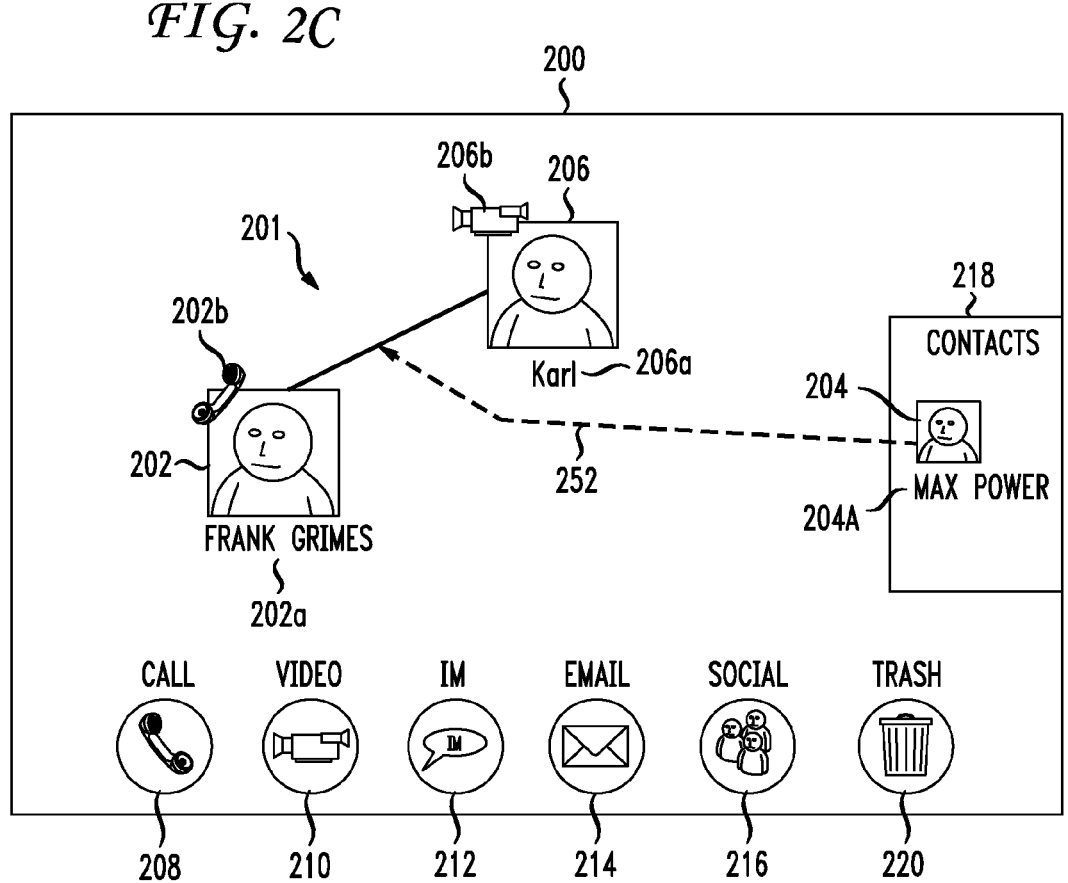
FIG. 2C illustrates an initial view after accepting the incoming communication session.
Figure 2D:
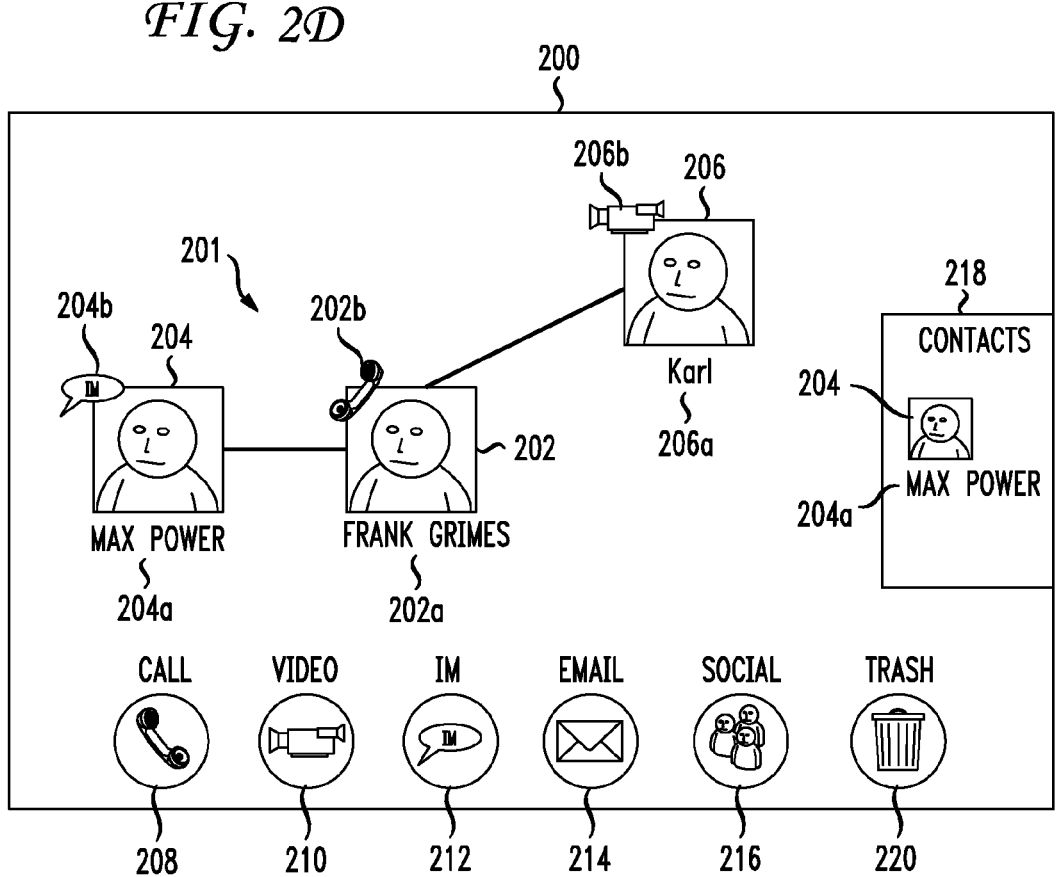
FIG. 2D illustrates a view of the communication session after adding a third party.

FIG. 2C illustrates a view after the user accepts the incoming communication session 201. In addition to the icon for Karl 206, the user's own icon 202 (the example user being Frank Grimes) appears in the communication session 201 as an icon 202 connected to Karl 206. Franks's icon 202 is optional and can include sub-parts such as a name/title 202a and a communication modality icon 202b. In this case, because the user responded to the incoming request with the telephone icon 208, Frank 202 communicates with Karl 206 in the communication session 201 via telephone, indicated by the smaller telephone icon 202b. Karl's icon 206 includes a video icon 206b which can represent video conferencing capability. Assume Frank 202 then wishes to add Max Power 204 from a list of contacts 218 to the communication session 201. The user 202 clicks and drags 252 Max Power's icon 204 directly from the list of contacts 218 and drops it on the communication session 201. The system 100 adds Max Power to the communication session as shown in FIG. 2D.

The system 100 can provide an interface to the user such that the user can use multiple different connection metaphors to establish or manipulate communication sessions. For example, the system 100 can display participant icons on the screen, show interconnections between participants and allow the user to place mode icons on each interconnection to establish the session. The system 100 can allow the user to position participant icons on the screen, select a mode and hit a button such as "go" or "connect". The system 100 can place participant icons on the screen, overlay communication mode icons on each participant icon and allow the user to hit "go" or "connect". These interface options are exemplary. The actual interface can be implemented in any of a number of variations.

In one aspect, participants join the communication session 201 via a telephone call. However, the communication session 201 is neutral with respect to various communication modalities and treats each the same even as users seek to join a call or other communication session.

In another aspect, the system 100 integrates the functions of one or more communications device. In this case, the display 200 shown in FIG. 2D may represent a computing device 100 (such as is generally shown in FIG. 1) that includes a microphone and speakers as well as a display. Such a device could act both as (1) a simple telephone to communicate via a telephone call the user's voice to another caller or a communication session and/or (2) a communication session management system for displaying an image representing the various parties or entities involved in the session and receive instructions to add or remove individuals and other wise manage the variety of parameters that are associated with a communication session 200.

The system 100 receives input via a physical or on-screen keyboard, mouse, stylus, touch screen, speech command, and/or single-touch or multi-touch gestures. Before a communication session is established, the system 100 can show a home screen where the graphical elements representing communication utilities such as 208, 210, 212, 214, 216 and 220 are shown. In one variation, the system 100 displays a summary or welcome page showing a short summary of news, messages, contacts, upcoming calendar events, and/or configuration options. In yet another variation, the system 100 displays a default input mechanism, such as a ten-key numeric pad for dialing telephone numbers.

The display 200 shows a communication session 201 of three connected graphical elements or entities 202, 204, 206. The set of graphical elements can include images, caricatures, avatars, text, and/or a hyperlink to additional information related to a user associated with the graphical elements. Any combination of graphical data can be presented to provide information about individual users, a connection mode, status, presence, other mode capabilities, and so forth. The text can include a name, a title, a position, a bio, a telephone number, email address, a current status, presence information, and location. The system can change or animate the graphical elements based on a contacted party context, persona, presence, and/or other factors. For example, an element may show an avatar or the person's face but show their eyes closed. This can mean that the person is not actively on the call or paying attention to the call. The avatar may show the person looking away or to the side or can show the person shaded or in some other graphical representation that they are not actively on the call, or that they have muted the call, on a sidebar and so forth. Active connections to the communication session can be visually represented as a graphical connection metaphor having overlapping graphical elements, a line connecting graphical elements, a shape connecting graphical elements, a shape with radiating lines connecting graphical elements, and/or a common augmented appearance of graphical elements. Overlapping or otherwise grouping graphical elements can represent individuals at one location. In such a case, information about the location can also be provided. Further, changing color, thickness, animation, texture, and/or length of graphical elements can indicate a relationship or status of entities represented by the graphical elements.

The displayed communication session 201 in FIG. 2D represents a real-time communication of entities in a session. In this example, the real-time communication is a three-way communication session 201 between Frank Grimes 202, Max Power 204, and Karl 206, shown by connecting lines between their respective icons 202, 204, 206. It is assumed in FIGS. 2A-2D that Frank 202 is viewing this particular screen and is the host or manager of the communication session 201. Thus, the display 200 is the graphical display the system presents to him. Later figures will show the same communication session 201 from the points of view of the other participants.

The call setup or communication session set up procedure shall be discussed next. In order to establish a communication session 201, the user can drag and drop a contact from a list of contacts 218 or from some other selection mechanism into the blank area or some designated spot such as over a the element 202 representing Frank Grimes. Each participant in the communication session 201 or contact in a list of contacts can have multiple associated addresses, phone numbers, or points of contact, such as a work phone, home phone, mobile phone, work email, home email, AIM address, social networking address such as a Facebook chat address, and the like. Each participant may also have an icon 202b, 204b, 206b or a qualifier that indicates not only the party but the contact mode. At this stage, a telephone number to be called or other communication address for alternate modes needs to be identified. The system can present an interface or menu which enables the user to enter via a keypad of any type a phone number to dial or to select a number for the user from a listing of numbers, or type in an email address for example if the user only can be reached by email. The system may only have one phone number for the selected contact and automatically dial that number. The system may also automatically select from available numbers based on any criteria such as previous history, presence information etc. FIG. 2D illustrates the stage in the process in which the user Frank Grimes 202 has created a communication session with both Max Power 204 and Karl 206 as shown and described in FIGS. 2A, 2B, and 2C.

The communication session 201 is not limited to a telephone call. The interface 200 enables the management of any communication session mode. When the user initiates a call, instant message, text message, videoconference, or the like with another user, the system 100 establishes a connection to the other party and displays a graphical representation of the communication session with the other party on the screen. The user can then add additional parties to the communication session in a similar manner. The user can remove participants from a communication session by dragging their element to a trash can icon 220, providing a flicking motion, clicking an X associated with that participant, highlight a participant and shaking the device, if it is mobile with accelerometer capability or click a physical or graphical disconnect button. In one aspect where the communication session is via telephone, the system 100 removes participants from the communication session when the user hangs up the telephone receiver. As participants leave the communication session 201, the system 100 removes their icon from the graphical representation of the communication session. As can be appreciated, adding and removing individual participants to and from the communication session occurs via the same drag and drop or other user input.

The graphical elements in FIGS. 2A-2D are icons, but can also include images, text, video, animations, sound, caricatures, and/or avatars. Users can personalize their own graphical elements or feed a live stream of images from a camera or video camera, for example. In addition, the graphical elements can have an associated string of text 202*a*, 204*a*, 206*a*. The string of text can include a name, a title, a position, a telephone number, email address, a current status, presence information, location, and/or any other available information. The string of text can be separate from but associated with the graphical element, as shown in FIGS. 2A-2D. Alternatively, the system 100 can overlay the string of text on top of the graphical element or integrate the text as part of the graphical element. All or part of the text and/or the graphical elements can be hyperlinks to additional information related to the user associated with the text or graphical elements, such as a blog or micro blog, email address, presence information, and so forth.

The system 100 can include for each icon 202, 204, 206 a respective graphical sub-element 202*b*, 204*b*, 206*b* that indicates the communication mode for each participant. For example, Max Power 204 is participating via an instant messaging (IM) client 204*b*; Frank Grimes 202 is participating via telephone 202*b*; Karl 206 is participating via a video conference client 206*b*. The system 100 is mode-neutral, meaning that the system 100 treats each mode of communication the same, such as telephone, cellular phone, voice over IP (VoIP), instant messaging, e-mail, text messaging, and video conferencing. As a user changes from one mode to another, the sub-elements can change accordingly. For example, if Frank Grimes 202 changes from a landline to a cellular phone mid-conference, the telephone icon 202*b* can change to a mobile phone icon.

Inasmuch as the system enables users to communicate in a session in different modes, the system can also modify the modes to align them in the session. Instant messages can be converted to speech and spoken in the teleconference from Max Power and speech can also be converted to text and transmitted to Max Power 204 for effective communication across modes.

The graphical elements can also convey information about the communication session by changing type, size, color, border, brightness, position, and so forth. The lines, for example, can convey relationships between participants. A user can manually trigger the changes for his or her own icon or others' icons, or the system 100 can detect change events and change the graphical elements accordingly. Change events can be based on a contacted party, context, persona, and/or presence. For example, as one person is talking, the system 100 can enlarge the icon representing that person. As another example, the system 100 can track how much each person in the communication session is talking and move graphical elements up and down based on a total talk time in the communication session.

In another variation, the system 100 modifies the links connecting the graphical elements 202, 204, 206 by changing their thickness, length, color, style, and/or animating the links. These modifications can represent a currently talking party, shared resources, an active communication session, a held communication session, a muted communication session, a pending communication session, a connecting communication session, a multi-party line, a sidebar conversation, a monitored transfer, an unmonitored call transfer, selective forwarding, selective breakup of the communication session into multiple communication sessions, and so forth. In this manner, the user can obtain knowledge about the status of the session, the types of communications that are occurring, and other important details about the communication session.

In one aspect, a user provides input such as a gesture (such as drag and drop, tap and drag with a touch screen or performs any other instructive user input) to manipulate and manage the communication session. For example, the user can click a call icon 208, a video conference icon 210, an IM icon 212, an email icon 214, or a social media icon 216 to invite another user to join the communication session. A user can drag these icons and drop them on a contact or on a participant in a current communication session. For example, if an incoming communication session is in one modality (IM 212 for example), the user can drag the call icon 208 onto the incoming communication session to accept the incoming communication session but transcode it from IM to a call.

Some basic examples of how a user can interact with such icons are provided below. The disclosure will step through example uses of each utility icon 208, 210, 212, 214, 216 and 220. The first example will illustrate use of the calling icon 208. Assume the users Karl 206 and Frank 202 are shown as in FIG. 2C in a communication session but that it is via email and not a phone call. Frank 202 could desire to simply talk on the phone. In this case, Frank 202 could provide instructive input such as double tapping on the call icon 208 which would instruct the system to recognize a communication session exists but that a new mode of communication is requested for that session. A telephone call is then established between Frank 202 and Karl 206 and optionally graphically illustrated on the screen 200 with phone icons such as 202*b*.

An example of the use of the video icon 210 is presented next in the context of the initial display shown in FIG. 2A. Frank 202 taps and holds with one finger on the video icon 210 and simultaneously taps on the icon for Max Power 204 in the list of contacts 218. The system 100 recognizes the two inputs and interprets them as a request to initiate a video conference communication session with Max Power 204. The system 100 can retrieve presence information for Max Power 204 to determine if Max Power 204 can accept a video conference communication. Information 204*a* can indicate that Max has video conference capability and is currently available. If so, the system 100 establishes a communication session via video between Max 204 and Frank 202 and updates the display 200 accordingly. If not, the system 100 can ask Frank 202 if he desires to select another communication modality. Frank 202 can then tap on one or more available utility icons.

An example use of the IM icon 212 is presented next in the context of FIG. 2D. Frank 202 drags Karl 206, who is already a participant in an existing communication session, onto the IM icon 212 to establish an IM sidebar with that participant. The system 100 creates an additional communication session between Frank 202 and Karl 206 via IM that is separate from but concurrent with the main communication session 201. The system 100 can optionally show a representation of the IM sidebar between Frank 202 and Karl 206 to Max Power 204.

In an example use of the email icon 214 also in the context of FIG. 2D, Frank 202 can swipe three fingers over the email icon 214 on a touch screen to send a mass email to all or a portion of the participants in current communication sessions. The system 100 can identify all participants represented in the display 200 and retrieve available email addresses for those participants. If some participants do not have an available email address, the system 100 can intelligently select a suitable replacement, such as IM or SMS based on availability in general or current presence information or a current mode. After or while the system 100 is gathering all the email address information, Frank 202 can enter a message in a popup window and click send. The system 100 then sends the message to the intended recipients.

The social networking icon 216 is discussed in the context of FIG. 2D. Frank 202 double taps on the social networking icon 216. In one variation, the system 100 visually identifies which participants are not part of Frank's social network. Frank 202 can then click or tap on the visually identified participants to quickly add them to a social network such as LinkedIn or Facebook. In another variation, when Frank 202 taps once on a social networking icon 216 and once elsewhere, the system 100 can post on a social network data related to the location of the second tap, such as an audio clip, a document, a video file, a link, text, an image, or any other data. Social media include web sites such as Facebook, Twitter, LinkedIn, MySpace, and so forth.

The user can interact with the trash icon 220 by flicking participant icons in the general direction of the trash icon 220, drawing an X over a participant icon or over an entire communication session, shaking the device if the device is mobile or via other instructive input. The system 100 can terminate a communication session, delete a contact, remove a participant from a communication session, or take other actions based on the user interaction associated with the trash icon 220. Of course the trash icon 220 can take any other graphical image which reflects that a person or entity is leaving a communication session, such as door or a window. For example, a window or door can be on the display screen and the host can remove an entity from a communication session by moving the respective icon to the window or door. As can be appreciated, user interaction with a utility icon and at least one entity in a communication session can take many forms as discussed above. Each example interaction can be applied to other utility icons in a similar manner.

A user can also initiate a communication session by dragging and dropping an appropriate icon onto a contact. Alternatively, the user can browse through a list of contacts 218, then drag and drop a desired contact to add the desired contact to the communication session. The system 100 then automatically contacts that person in their desired mode, a sender preferred mode, a currently available mode based on presence information, or in a common available mode between the participants and joins that person to the communication session. The system 100 can display other information as well, such as a calendar, notes, memos, personal presence information, and time. A user can manually and seamlessly switch over from one modality to another midsession. For example, a user participating in a communication session via cell phone who is now near a webcam can drag a video conferencing icon onto the communication session to switch from cell phone to video conferencing. The system 100 display can be user-configurable.

While drag and drop is used primarily in these examples, any user input can be provided such as tapping, flicking with a gesture, etc. to indicate a linking of a selected utility icon 208, 210, 212, 214, 216 with one or more participants (which may include people and non-person entities like a conference call or a calendar item).

In one aspect, user preferences guide the amount and type of information conveyed by the graphical elements and the associated text. User preferences can be drawn from a viewer's preferences and/or a source person's preferences. For example, a viewer sets preferences to show others' email addresses when available, but a source person sets preferences as never share email address. The source person's preferences (or preferences of the "owner" of the information) can override a third party's preferences.

Figure 3:
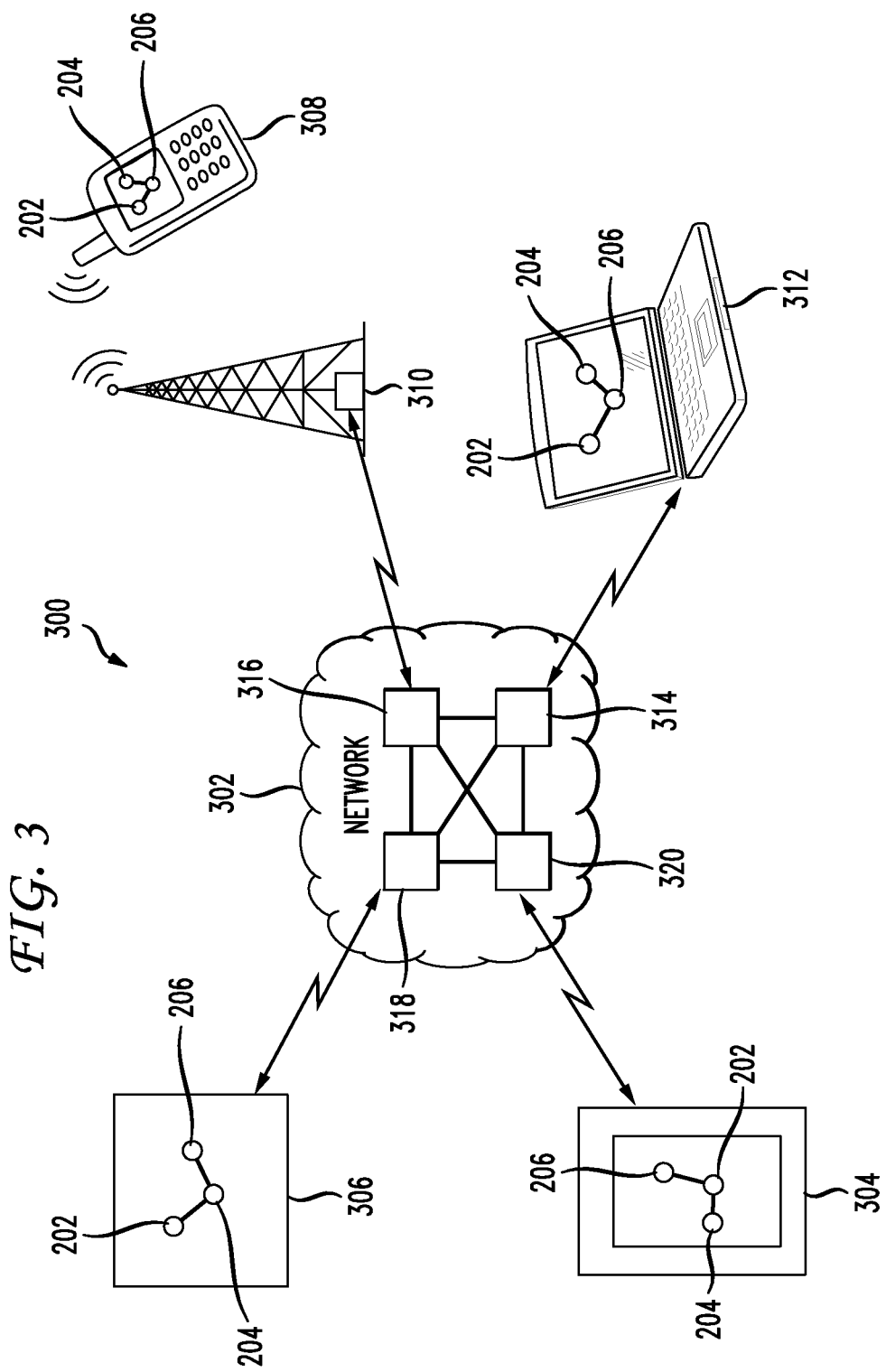
FIG. 3 illustrates a network view of the communication session.

Having discussed several variations of FIGS. 2A-2D, the discussion now turns to a network view 300 of the communication session as shown in FIG. 3. A network 302 connects various communications devices 304, 306, 308, 310, 312 and conveys information from device to device. The telecommunications network can be one of or a combination of a plain old telephone service (POTS) network, an asynchronous transfer mode (ATM) network, the world wide web, an integrated services digital network (ISDN), frame relay network, Ethernet network, token ring network, and any other suitable wired or wireless network. The network can include one or more interconnected nodes 314, 316, 318, 320 which perform all or part of the connection and transmission functionality that underlies the graphical representation of communication sessions on a GUI. Such network nodes 314, 316, 318, 320 can perform all the functionality in the network 302 or can operate in conjunction with end-user communication devices 304, 306, 308, 312 to manipulate communication sessions. Only the display component is shown for devices 304 and 306.

In one aspect, a centralized entity such as node 320 controls the communication session. The centralized entity 320 can reside in the network and/or communicate via the network. The centralized entity 320 can operate as a centralized enterprise intelligence server. In another aspect, the communication session control and functionality is distributed among multiple server resources 314, 316, 318, 320 in the network or cloud 302. In addition to a centralized intelligence and distributed intelligence in the cloud, the network 302 can provide this functionality using a peer-to-peer approach with intelligence on the endpoints 312, 308, 306, 304. Some variations include providing standardized functionality on a standards-compliant server and non-standardized functionality distributed across the endpoints. In some respects, the "system", "device", "communication device" or other characterization of a hardware component that performs certain steps can be interpreted as one or more of the various devices as endpoints or network elements shown in FIGS. 1 and 3.

Each communications device 306, 304, 312, 308 of FIG. 3 shows a different aspect or view of the same communication session. For example, the display of device 304 shows the same display of the same participants 202, 204, 206 as shown in FIG. 2D. The display of device 306 shows the same participants 202, 204, 206 in a different view of the communication session from the perspective of device 306. Likewise devices 308 and 312 show the same participants 202, 204, 206 in different views which can each be tailored to the individual participants in the communication session. Device 304 can represent a host or manager of the communication session but someone who is not shown as participating in the call.

In one aspect, a mobile device 308 connects with a base station 310 to connect to the network. A mobile device 308 can generate its own view of the communication session or it can generate a duplicate or a companion view of another device's display.

In general, the management of the communication session involves a user, such as the user interfacing with device 304, providing input to the graphical interface. The input as is noted herein involves an action step for manipulating or managing the communication session. Corresponding instructions are provided to the network node 320 or network nodes which actively provide the communication links to the various participants. Thus, the network node or nodes will carry out the instructions received from the managing device such that actions like communication session bridging, removing a person from the session, establishing a sidebar discussion, separating the communication session into several smaller communication sessions, and so forth, are appropriately carried out.

FIG. 3 also can illustrate a view of a person or entity who seeks to contact someone in a communication session. For example, assume Mary has device 304 and wants to call Frank 202. If she does, if permissions are granted, she can be presented with a visual of Frank's communication session showing 202, 204, 206. This can provide her varying levels of detail with respect to the type of communication, who is on the call, the subject matter of the call, etc. In this manner, Mary can be presented with options since she now has this knowledge. Perhaps she may want to IM or email instead of call. She may request to join the conference call. She me want to send a message to Frank 202 that she noticed he was on a call and could he return her call in 1 hour. Presenting Mary with a graphical image of the communication session presence of the person she is calling enables a more efficient mechanism for her to determine how to best take the next step in communicating with Frank 202.

Figure 4:
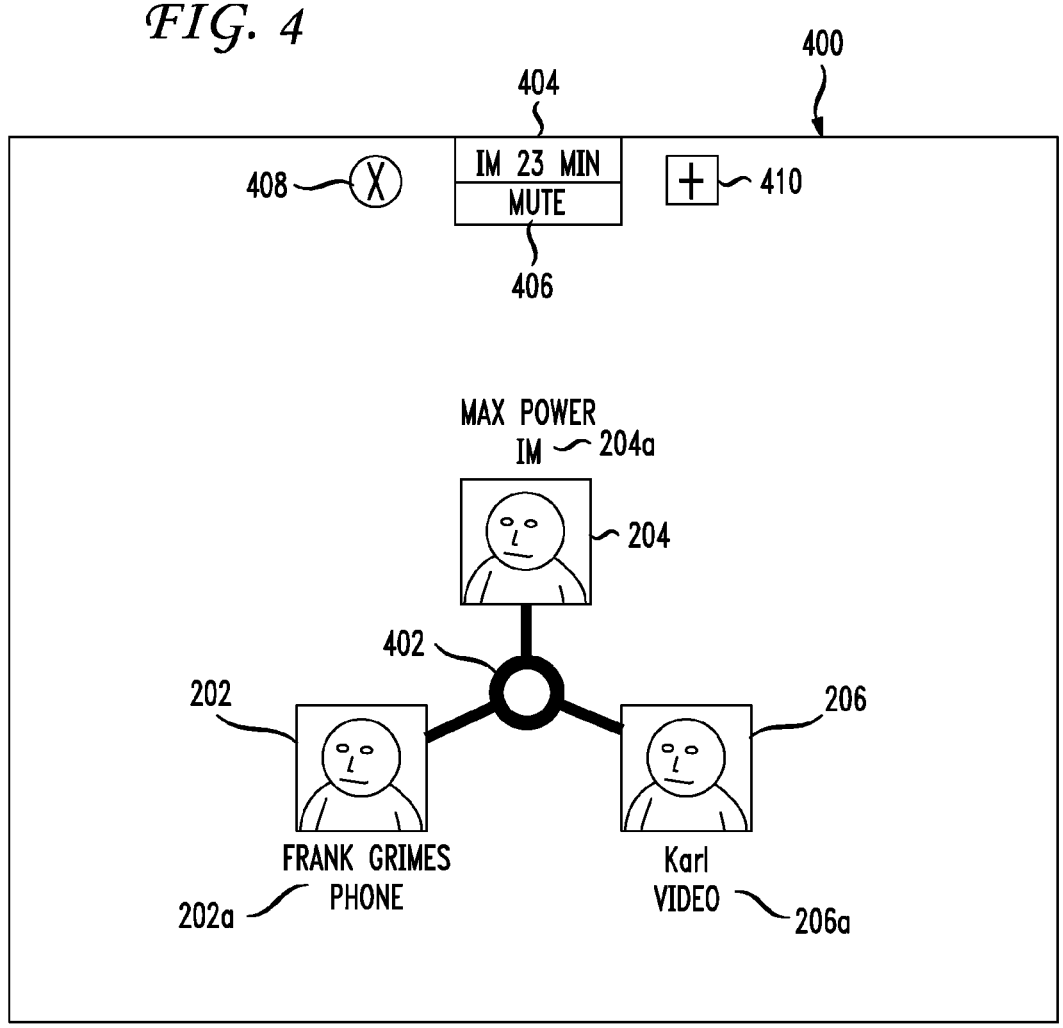
FIG. 4 illustrates a second view of the communication session.

FIG. 4 illustrates a different view 400 of the same communication session shown in FIG. 2D, but from the perspective of Max Power 204. In this case, Max Power is the moderator, so Max's icon 204 appears at a central location compared to the remaining participants' icons 202, 206. Each participant's icon has associated text 202a, 204a, 206a indicating name and communication mode. The text 202a, 204a, 206a can also represent other data about each person or can include icons indicating various types of data such as communication mode, presence, temporal information, calendar information, hierarchical information, employer information and so forth. The system 100 can arrange the icons based on an organizational hierarchy, role, location, seniority or other combinations of parameters.

The interface 400 in FIG. 4 uses connecting lines and a central hub 402 and spokes from the participants to the hub to indicate that the three participants 202, 204, 206 are in the communication session. As the system 100 engages in additional communication sessions, the display shows additional concurrent sessions in different locations. In some cases such as instant messaging, a single location contains multiple communication sessions of a same type. For example, multiple IM communication sessions can be displayed as a stack of cards at a single location. The hub 402 of FIG. 4 and the lines connecting icons in FIG. 2D are also illustrative display configurations for active connections. Other configurations of icons, text, and/or graphical elements can replace those shown herein.

The display 400 can include a title bar 404 and various controls such as a mute button 406, an exit button 408, a transcription button, and an "add participant" button 410. When a user clicks on the "add participant" button 410, the system 100 can present the user with a dialog to select one or more participants to add. The title bar 404 can include information such as call duration, call moderator, and preferred communication mode. When a user clicks on the mute button 406, the system 100 can mute the user's line or other participants' lines. For a participant, clicking the exit button 408 causes that participant to leave the conference. The moderator could also highlight one of the participants with a click or gesture and then click on exit 408 to remove them from the conference. The conference moderator can also terminate the communication session for all participants by clicking the exit button 408.

When a user clicks on a transcription button (not shown), the system 100 can engage a speech recognition module to recognize and transcribe speech. The system 100 can display transcriptions in real time, such as a ticker of text beneath a user's icon. The system 100 can also prepare a full transcript of an entire communication session and email the full transcript to selected participants after the communication session ends. The system 100 can transcode audio from a telephone call to text for a text messaging session via automatic speech recognition (ASR) and can convert in the other way via text-to-speech (TTS). Thus, Max 204 can communicate via IM with Frank 202 and Karl 206 in the same session but in different modes. These differences can be visually representing in the session display.

Alternatively, the user can browse and select a participant from a list of contacts and drag desired participants directly into the graphical representation of the conference. A user can also add a party to the communication session, invite a party to the communication session, drop a party from the communication session, split a communication session, form a sidebar communication session, and merge two communication sessions. A sidebar communication session is a concurrent session between two or more participants in a main communication session, but separate from the main communication session. For example, if Max Power 204 is proposing an idea, Frank Grimes 202 and Karl 206 can form a sidebar to discuss the proposed idea without Max Power listening or even knowing about the sidebar. In some cases knowledge of the sidebar's existence is available to other participants, but the other participants do not know what is being communicated in the sidebar.

Figure 5:
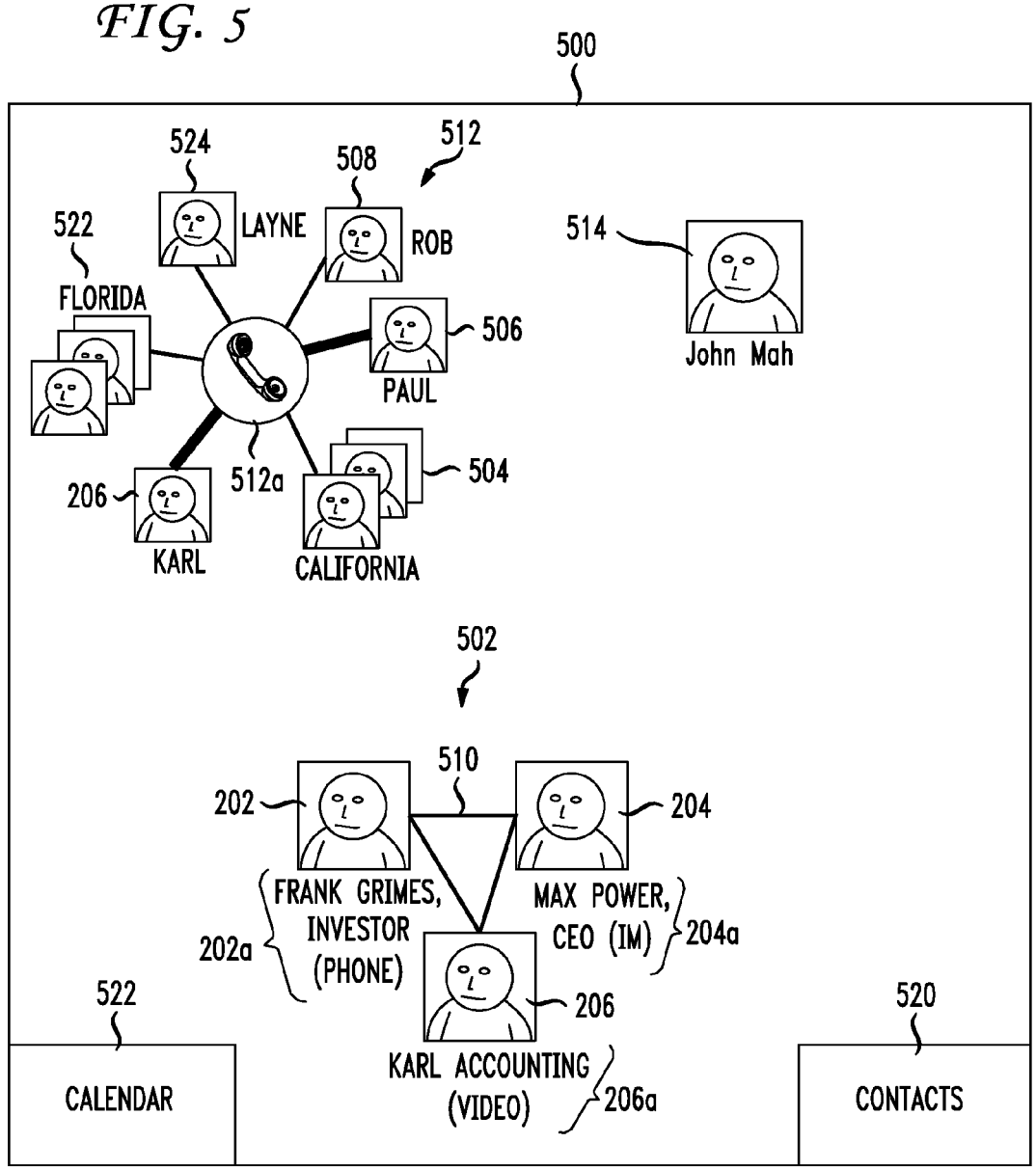
FIG. 5 illustrates a third view of the communication session with other concurrent communication sessions.

Having discussed several variations of FIG. 4, the discussion now turns to FIG. 5, which illustrates a third view 500 of a communication session 502 between Max Power 204, Frank Grimes 202, and Karl 206, but from the perspective of Karl 206 and with another concurrent real-time communication session 512 and a current incoming call 514 for Karl 206. The active connections of the communication session 502 are shown here connected via a triangle 510. The system 100 as shown in FIG. 5 can display overlapping graphical elements, a line connecting graphical elements, a shape connecting graphical elements, a shape with radiating lines connecting graphical elements, and/or a common augmented appearance of graphical elements. The system can group close together or overlap icons corresponding to individuals at a same location. Thus, the visual representation can vary for each "participant" in a communication session depending on the individual, location, grouping of people, and so forth. This visual image gives the participants and easy understanding of who is in the communication and the ability to easily manage the session graphically.

The display in FIG. 5 shows three separate concurrent communication sessions 502, 512, 514. The first communication session 502 is between Max 204, Frank 202 and Karl 206. Respective metadata is shown 202a, 204a, 206a. The second communication session 512 is a communication session in which Karl is a participant and which includes a group from California 504, Paul 506, Rob 508, Layne 524, and a group from Florida 522. Thus, Karl 206 is a simultaneous participant in two communication sessions. The system 100 displays each communication session separately. In addition to these two communication sessions, the system 100 displays an incoming communication 514 from John Mah. The incoming communication icon 514 can blink, bounce, pulse, grow, shrink, vibrate, change color, send an audible alert (such as a ringtone), and/or provide some other notification to the user of the incoming call. Karl 206 can interact with and manipulate this incoming request in the same manner as the other current communication sessions. The system 100 does not differentiate between an active communication session and a communication session representing an incoming call. For example, Karl 206 can drag and drop the incoming call 514 on top of the communication session 512 to add the incoming call directly to the communication session 512 or 502. As another example, Karl 206 can drag and drop the incoming communication 514 to a trash can icon to ignore the call, double click on the incoming communication 514 to send the incoming caller (if it is a call) to voicemail, or tap and hold to place the caller on hold.

If Karl 206 accepts the incoming communication 514 from John Mah, the system 100 creates and displays a new communication session including Karl 206 and John Mah (not shown in FIG. 5). The system 100 can place the new communication session elsewhere on the display.

The system 100 can visually represent active connections as overlapping graphical elements for individuals at one location. For example, in the second communication session 512, the participants from Florida are overlapped as are the participants from California. The user can manipulate these overlapping icons to identify or communicate with participants in a communications session.

The display can include a listing of contacts 520 and calendar events 522. User interactions with the contacts can trigger an expanding view or a popup window with more information. The user can then click on a particular contact to see a list of available modes of communication for that contact. The system 100 initiates an additional communication session with that contact based on a user selection of an available mode of communication. The system 100 connects and displays that communication session along with the existing three 502, 512 and the newly added session with John Mah (not shown).

Further, the system 100 can include a search capability. A user can search for contacts, calendar events, email addresses, phone numbers, and so forth. This approach can be advantageous for users with very large contact lists or for finding all members of a particular department.

Often a contact will include several contacts for a particular communication modality. For example, one contact can include four phone numbers, two text message numbers, three email addresses, and so on. In these cases the system 100 can intelligently select one of the available addresses or numbers for a selected modality, or the system 100 can present a disambiguation dialog so the user can select a desired address or number.

In many instances, a user will not have a contact entry for all the other communication session participants. To add a communication session participant as a contact, the user can drag and drop the desired icon on the contacts icon. The system 100 can automatically locate available information about that participant to add to the contact database.

One possible user input is to divide the communication session shown in FIGS. 6A-2B. The user can draw a line with a mouse drag or a finger on a touch screen separating the communication session into two groups. The system 100 can then divide the communication session into two separate concurrent communication sessions based on the groups. In one aspect, a communication session manager can divide a communication session for a limited time, after which the communication sessions are automatically merged together. For example, a manager can say "Team A, discuss pros and cons of strategy A. Team B, discuss pros and cons of strategy B. After five minutes, we'll return and report on our discussions." Then the manager draws a line or otherwise selects groups for the breakout sessions and sets a duration. A dialog or icons can appear when the communication session is separated which present the available options for managing the separation. The system 100 divides the communication session and rejoins them after the set duration. The manager can indicate additional settings, such as prohibiting sidebar conversations between the groups during the breakout sessions. The manager can be independent of the breakout sessions and monitor each breakout session via audio, summary, and/or real-time text.

Figure 6:
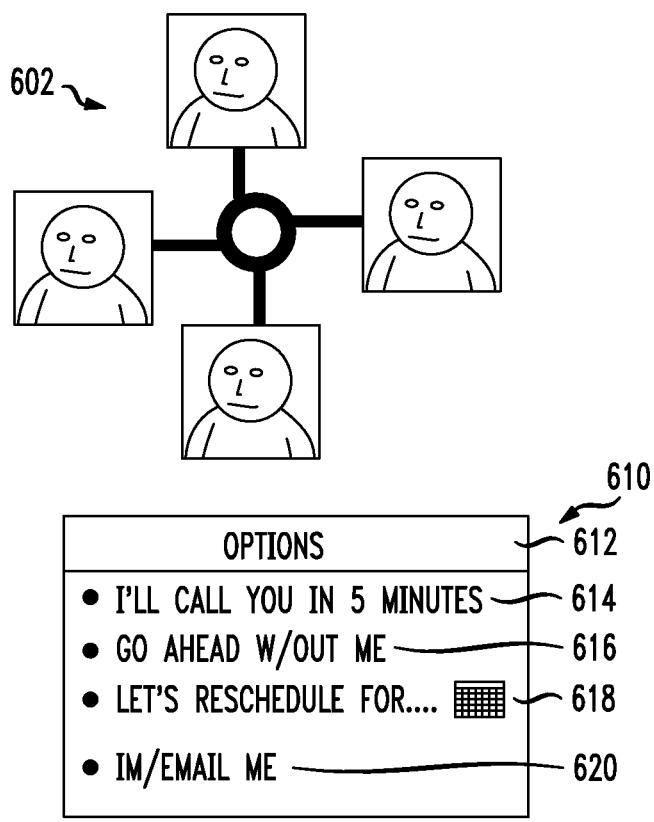
FIG. 6 illustrates an example contextual popup for an incoming conference call.

FIG. 6 illustrates an example contextual popup 600 for an incoming conference call. The system 100 displays the incoming conference call contextual popup on a GUI with other concurrent real-time communication sessions, if any. In this context, assume that a user is currently on a conference call or communication session and has forgotten about another scheduled communication session such as a conference all. (For example, with brief reference to FIG. 5, Karl may view on display 500 the contextual popup 600 while being on a communication session 502 rather than the incoming call 514.) The system 100 can present a contextual popup of an incoming conference call 606. This contextual popup 600 can be treated similar to a user receiving an incoming call request to someone already involved in a communication session 502 as discussed above with reference to FIG. 5. The contextual popup 600 can include a title 602, a body 604, and action buttons. In this case, the action buttons are answer 606, ignore 608, and more 610. The body 604 can include an icon or other graphical element associated with the calling party. The system 100 can display additional menu items when the user clicks on the more button 610. The system 100 can select additional menu items 612, 614, 616, 618, 620 based on the incoming call type, incoming call party, previous selections, and other relevant information.

In this example, the incoming call is not from a person but an incoming communication session 602 to the user from a scheduled conference call or a request from a conference call for the user's participation and an optional menu 610 of options 612. The additional menu items include "I'll call you back in 5 minutes" 614, "Go ahead without me" 616, and "let's reschedule" 618, and IM/email me 620. .The menu item "Let's reschedule for . . . " 618 includes a clickable calendar icon that allows the user to quickly select a date and/or time based on his or her available calendar information. Any of these menu options can include a fillable or selectable portion that allows the user to effectively fill in the blank with desired information. Other options include sending an IM, email, or other communication to the conference call or to the host of the conference call or to an identified participant of the call. Such options can be tailored to the specific type of communication that was scheduled as well.

The incoming conference call can show a list of expected and/or current participants. The user can enter, type in, select, or record a personalized media message or components of a media message to send to the conference call participants. Media message components can include a greeting, a name, an apology, a rescheduling request, and so forth. If the user accepts the incoming communication session, the system 100 creates a communication session in the GUI that is separate from but concurrent with other active communication sessions, if any.

In another variation, assume that a group of participants are on a conference call that Karl was not scheduled to attend. The participants would like to include Karl in the call. In this scenario, a host or any other participant, through an interface such as that shown in FIG. 5, can select Karl from his contacts list 520 and send a request to join the conference call. The host or other participant can record a brief message or be presented with a field to type a brief message such as: "Hi! Can you join this conference call now? We're talking about the new sales plan." Context information about the conference call can automatically be gathered to list those participating as shown in FIG. 6. Since context information can be automatically gathered, the host does not have to type out a listing of who is on the call but can efficiently give the substance of why they desire Karl on the call.

As can be seen, the incoming communication sessions can take a variety of forms including automatically generated requests based on scheduled events, a manual request for a communication session, or other types of communication such as conference calls. The user can even set up notifications such as these to query about events such as birthdays or anniversaries such that a requesting notification could be presented in this context asking for instructions on what kind of gift to get or flowers to buy.

Figure 7:
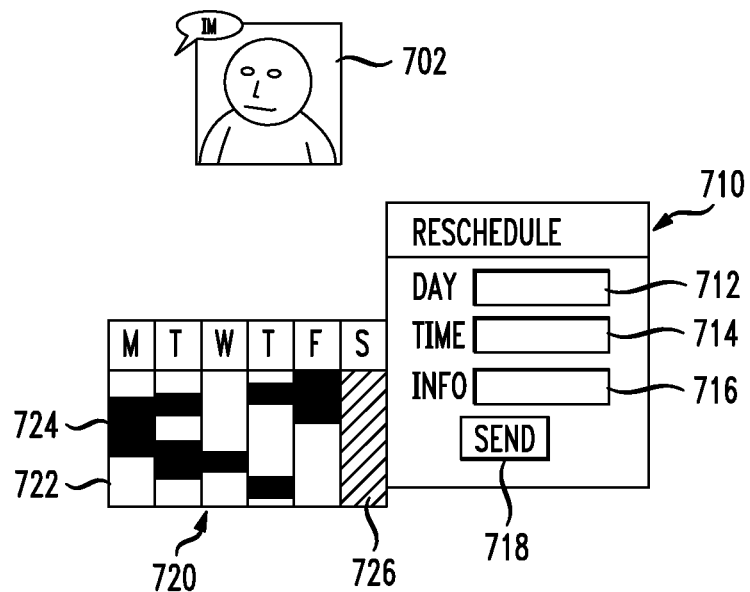
FIG. 7 illustrates an example rescheduling form with fillable or selectable fields.

FIG. 7 illustrates an example rescheduling form with fillable or selectable fields. A contextual popup for an incoming instant message may include a scheduling portion. The contextual popup can include a title, a body, a reply box for engaging in an instant messaging conversation in response to the incoming message, and a rescheduling button. When the user clicks on the rescheduling button, the system 100 can display a rescheduling form 710 with fillable or selectable fields for context-sensitive information such as day 712, time 714, and additional information 716. The rescheduling form can include a "send" button 718 when the user is finished with the rescheduling form 710.

In one aspect, the rescheduling form 710 includes a calendar element 720. The calendar element 720 can show available times 722, unavailable times 724, and undesirable times 726 for one or both parties to the communication. The user can click on a time in the calendar element 720 to automatically fill in the fields 712, 714, 716 in the rescheduling form. If the contextual popup 700 is for a conference call with two or more members, then calendar information for the entire group including the person receiving the notification could automatically populate the calendar 720 such that each participant or the recipient of the incoming IM contextual popup 700 could easily reschedule.

Figure 8:
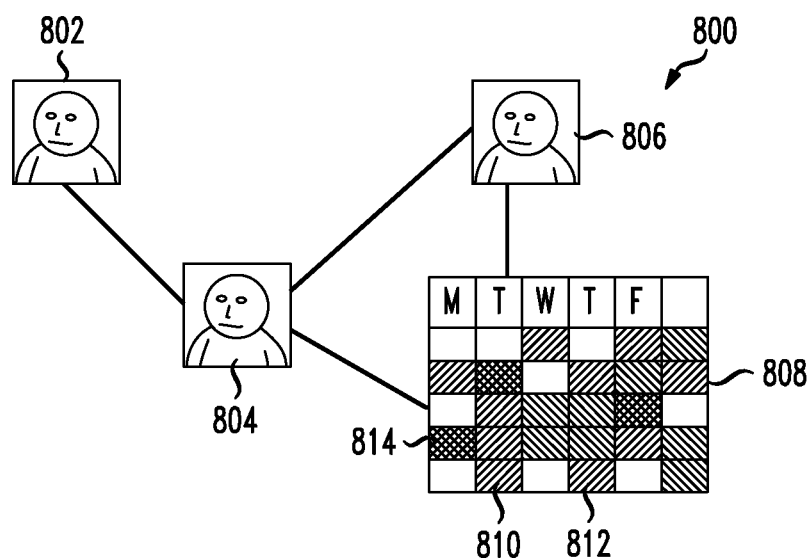
FIG. 8 illustrates an example graphical representation of a communication session with a scheduling graphical element shared between two users.

FIG. 8 illustrates an example graphical representation of a communication session 800 with a scheduling graphical element 808 shared between two users. The illustrated communication session 800 includes three users 802, 804, 806. The system 100 can recognize that user 804 and user 806 need to schedule something together based on speech recognition or other user input, such as dragging a calendar icon onto the other user. The system 100 introduces a scheduling graphical element 808 into the communication session connected to the users 804, 806 that are scheduling an event. The scheduling graphical element 808 can connect to more than two users. The scheduling graphical element 808 can connect to all participants in a single communication session or to participants spanning multiple communication sessions. In one aspect, the scheduling graphical element 808 incorporates information from associated users' calendars to show in the GUI a succinct representation of available times. In this example, the calendar graphical element 808 includes one type of shading 810 representing unavailable times for the first user 804, a second type of shading 812 representing unavailable times for the second user 806, and a combination of the two types of shading 814 representing unavailable times for both users 804, 806. The white portions of the calendar graphical element 808 are times in which the two users 804, 806 can freely schedule an event.

In one aspect, the system 100 synchronizes multiple time zones for scheduling on a single calendar appearance to show common available times. For example, if a first user is in California (GMT −7:00) and a second user is in New York (GMT-4), the system can either convert calendar events in one time zone to the other time zone, or convert both time zones to a common time zone. Then, when the system 100 displays the scheduling graphical element 808, events from both calendars are accurately represented with respect to each other. The users can easily locate a suitable common available time.

The scheduling graphical element 808 can display any period of time, including an hour, a day, a week, a month, a year, and other time intervals. In one aspect, a scheduling requestor sets in advance the time frame of the scheduling graphical element 808.

The disclosure now turns to the exemplary method embodiment shown in FIG. 9. For the sake of clarity, the method is discussed in terms of an exemplary system 100 such as is shown in FIG. 1 configured to practice the method. Additionally, one or more network nodes shown in the network 302 of FIG. 3 can also perform any of the steps disclosed herein. Various combinations of processing are contemplated as within the scope of this disclosure including peer-to-peer control and processing to accomplish the various steps for managing communication sessions as disclosed herein.

FIG. 9 illustrates an example method embodiment for presenting a selected media message to a first user. The system 100 displays via a graphical user interface (GUI) a notification associated with a request from a first user for a communication with a second user in the context of a graphical representation of a communication session including at least the second user (902). The incoming request can be an incoming phone call, instant message, text message, request for video chat, or any other form of incoming communication. The first user can be an individual or a multi-party communication session. The second user can be an individual or a multi-party communication session. In one aspect, the "first user" is not a person but a conference call scheduled on the second user's calendar and an automated request is presented to the user on the interface. The "first user" could also be a request from a host of another conference call or other communication session in a social networking site for example who requests as a member of another communication session that the second user join and participate. A graphical user interface (GUI) can show the conference call communication session as a set of connected graphical elements representing a current structure of the conference call communication session and corresponding to participants in the conference call. In the case of a scheduled conference call communication session having known participants, the conference call communication session can include a placeholder for expected participants who have not yet joined the conference call. The placeholder can provide additional information about the expected participant, including current activity, presence information, location, status, and so forth.

The system 100 receives a second user input identifying a selected action associated with the first user via the GUI (904). The system 100 can notify the second user via a communication session displayed as a set of graphical elements representing a structure of the communication session via the GUI. FIG. 5 illustrates a notification of an incoming call 514 on such a graphical interface. The system 100 can determine the style, information, size, and position of the notification based on the incoming request and the user or entity generating the incoming request.

The system 100 performs the selected action relative to the first user (906). The GUI input can be a keyboard input, mouse input such as a drag and drop gesture, a selection from a dynamically generated menu, a speech command, a multi-modal input, and so forth. A dynamically generated menu can include fillable fields based on the selected media message. The menu can specifically present options for selecting a media message according to a type of communication for the first user. For example, if the request for communication is via telephone, the media message can be voice-based. If the request for communication is via instant message, the media message can be a short text-based message. The media message can be generated by the system, selected from a library of pre-generated messages, or recorded by the user after receiving the notification of the incoming request. In some cases, a user records or selects an audio-based message for an incoming communication mode that does not have an audio component. The system 100 can transform the media message according to a type of communication of the first user.

In one aspect, the selected media message includes instructions for handling the incoming request. The instructions can include placing the first user on hold, recording a message from the first user, and forwarding the first user to voicemail. The selected media message can include one or more of the following in addition to a portion selected by the second user: a caller-specific greeting, hold music, a request to initiate communication with the second user via a different communication modality, a second user-recorded message, and a second user-entered message.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
    displaying, by a processor and via a graphical user interface, a notification associated with an incoming request from a conferencing communication device for a first user, at a first user communication device, to join a conference call, wherein the notification associated with the incoming request comprises a text request from a third user, currently in the conference call, for the first user to join the conference call and a list of a plurality of participants currently in the conference call, wherein the first user is notified of the incoming request via a set of graphical elements, in the graphical user interface, representing a structure of the conference call that shows avatars connected together for the plurality of participants in the conference call, wherein the conference call comprises one of a voice or a video communication session, and wherein the first user communication device is currently involved in a second communication session with at least a second user communication device;

in response to receiving the incoming request and the first user communication device being currently involved in the second communication session, presenting, by the processor, to the first user, an interface to receive an instruction from the first user; and receiving, by the processor and via the graphical user interface, the instruction for handling the incoming request to join the conference call.

2. The method of claim 1, wherein the first user is notified of the incoming request via a set of graphical elements in the graphical user interface representing the conference call.

3. The method of claim 1, wherein the second communication session with the at least a second user communication device comprises a plurality of users.

4. The method of claim 1, further comprising:
presenting, by the processor, a dynamically generated set of options comprising fields for receiving inputs.

5. The method of claim 4, wherein the dynamically generated set of options specifically presents different options according to whether the incoming conference call is the voice or video communication session.

6. The method of claim 4, wherein the set of options comprises an option to have a separate communication session between the first user and the third user in a different communication modality.

7. The method of claim 6, further comprising, sending, by the processor, the request for the conference communication device to initiate the conference call with the third user via the different communication modality.

8. The method of claim 7, wherein the different communication modality is a different one of the voice or video communication session.

9. The method of claim 1, wherein the instruction comprises the first user recording a message for the conference call.

10. The method of claim 1, wherein the instruction comprises one of presenting a caller-specific greeting, playing a first user-recorded message, recording a first user call message, or a first-user-entered message.

11. The method of claim 10, wherein the instruction comprises the instruction of the first-user-entered message, wherein the first user-entered message is based on the incoming request from the first user communication device.

12. The method of claim 1, wherein the conference call is scheduled on a calendar of the first user.

13. The method of claim 1, wherein the instruction comprises an instruction to send a message to the conference communication device from a library of pre-generated messages based on the incoming request to join the conference call.

14. The method of claim 1, wherein the instruction comprises a menu option to reschedule the conference call and further comprising:

displaying, by the processor, a calendar, wherein the calendar comprises schedules from the list of participants currently in the conference call.

15. The method of claim 1, wherein the instruction comprises predefined option that also allows the first user to fill in additional desired information.

16. The method of claim 1, wherein the incoming call request from the conferencing communication device is in a calendar of the first user and in response to the incoming call request being in the calendar of the first user, displaying a menu of options for the first user.

17. A system comprising:
a processor; and
a computer-readable storage medium having stored therein instructions which, when executed by the processor, cause the processor to perform operations comprising:
displaying, via a graphical user interface, a notification associated with an incoming request from a conferencing communication device for a first user, at a first user communication device, to join a conference call, wherein the notification associated with the incoming request comprises a text request from a third user, currently in the conference call, for the first user to join the conference call and a list of a plurality of participants currently in the conference call, wherein the first user is notified of the incoming request via a set of graphical elements, in the graphical user interface, representing a structure of the conference call that shows avatars connected together for the plurality of participants in the conference call, wherein the conference call comprises one of a voice or a video communication session, and wherein the first user is currently involved in a second communication session with at least a second user communication device;
in response to receiving the incoming request and the first user communication device being currently involved in the second communication session, presenting, to the first user, an interface to receive an instruction from the first user; and
receiving, via the graphical user interface, the instruction for handling the incoming request to join the conference call.

18. The system of claim 17, wherein the second communication session has a plurality of participants.

19. The system of claim 17, wherein the instruction for handling the incoming request is based on one of a drag and drop gesture, keyboard input, mouse input, touch screen input, voice input, multi-touch input, and gesture input.

20. The system of claim 17, wherein the instruction comprises a menu option to reschedule the conference call and further comprising:
displaying, via the graphical user interface, a calendar, wherein the calendar comprises schedules from the list of participants currently in the conference call.

* * * * *